(12) United States Patent
Tseng et al.

(10) Patent No.: US 10,805,510 B2
(45) Date of Patent: *Oct. 13, 2020

(54) CAMERA DRIVING MODULE, IMAGE CAPTURING UNIT AND SMARTPHONE

(71) Applicant: LARGAN DIGITAL CO., LTD., Taichung (TW)

(72) Inventors: Te-Sheng Tseng, Taichung (TW); Ming-Ta Chou, Taichung (TW); Wen-Hung Hsu, Taichung (TW)

(73) Assignee: LARGAN DIGITAL CO., LTD., Taichung (TW)

(*) Notice: Subject to any disclaimer, the term of this patent is extended or adjusted under 35 U.S.C. 154(b) by 0 days.

This patent is subject to a terminal disclaimer.

(21) Appl. No.: 16/539,558

(22) Filed: Aug. 13, 2019

(65) Prior Publication Data

US 2019/0364181 A1 Nov. 28, 2019

Related U.S. Application Data

(63) Continuation of application No. 16/005,464, filed on Jun. 11, 2018, now Pat. No. 10,432,836.

(30) Foreign Application Priority Data

Apr. 18, 2018 (TW) ............................. 107113123 A

(51) Int. Cl.
*H04N 5/225* (2006.01)
*G02B 7/02* (2006.01)

(52) U.S. Cl.
CPC ............. *H04N 5/2254* (2013.01); *G02B 7/02* (2013.01); *H04N 5/2252* (2013.01)

(58) Field of Classification Search
CPC ........ G02B 27/64; G02B 27/646; G02B 7/08; G02B 7/09; G03B 2205/0015; G03B 2205/0069; G03B 3/10; G03B 5/00; H04N 5/2253; H04N 5/2254
See application file for complete search history.

(56) References Cited

U.S. PATENT DOCUMENTS

| 2014/0132826 A1* | 5/2014 | Kamatani ............ H04N 5/2254 348/357 |
| 2015/0212336 A1* | 7/2015 | Hubert ................ G02B 27/646 348/208.11 |
| 2016/0025995 A1* | 1/2016 | Ariji .................... G02B 7/08 359/557 |

(Continued)

*Primary Examiner* — Amy R Hsu
(74) *Attorney, Agent, or Firm* — Maschoff Brennan

(57) ABSTRACT

A camera driving module includes a base, a casing, a lens unit, a magnetic element, a coil, a spring and a damper agent. The base includes an opening. The casing is disposed on the base and includes a through hole and a broadwise notch structure. The broadwise notch structure is located nearby a periphery of the through hole. The lens unit is movably disposed on the casing and includes a protruding structure. The protruding structure is located at a periphery of the lens unit. The magnetic element is fixed to the casing and located at an inside the casing. The coil is fixed to the lens unit and located at an outside of the lens unit. The coil faces toward the magnetic element. The spring is disposed on the lens unit. The damper agent is disposed between the broadwise notch structure and the protruding structure.

20 Claims, 18 Drawing Sheets

(56) References Cited

U.S. PATENT DOCUMENTS

| | | | |
|---|---|---|---|
| 2016/0209621 A1* | 7/2016 | Park | G02B 27/646 |
| 2016/0313568 A1* | 10/2016 | Ichihashi | G03B 17/12 |
| 2016/0313569 A1* | 10/2016 | Ichihashi | G02B 7/04 |
| 2017/0153409 A1* | 6/2017 | Chan | G03B 5/00 |
| 2017/0357102 A1* | 12/2017 | Sato | G03B 5/00 |
| 2018/0164538 A1* | 6/2018 | Lee | G02B 7/02 |
| 2018/0231794 A1* | 8/2018 | De Beule | G02B 27/646 |

* cited by examiner

CAMERA DRIVING MODULE, IMAGE CAPTURING UNIT AND SMARTPHONE

RELATED APPLICATIONS

This application is a continuation patent application of U.S. application Ser. No. 16/005,464, filed on Jun. 11, 2018, which claims priority to Taiwan Application 107113123, filed on Apr. 18, 2018, which is incorporated by reference herein in its entirety.

BACKGROUND

Technical Field

The present disclosure relates to a camera driving module, an image capturing unit and a smartphone, more particularly to a camera driving module and an image capturing unit applicable to a smartphone.

Description of Related Art

With the development of semiconductor manufacturing technology, the performance of image sensors has been improved, and the pixel size thereof has been scaled down. Therefore, featuring high image quality has been one of the indispensable features of an optical system nowadays.

A vibration of the camera may be caused by unsuccessful assembling process, unavoidable functional elements and assembly tolerances. In order to compensate the vibration for achieving high image quality, a camera with vibration-reduction solution is provided to meet the present requirements. Specifically, a damper is adapted to reduce the movement of the camera. However, in a conventional manufacturing process, a test for assembling yield rate of the camera is performed after a damping material, taken as the damper, is dispensed on the camera. Thus, regardless of good or bad products, a step of dispensing the damping material will be implemented to lead to excessive use of the damping material, thereby increasing manufacturing cost.

SUMMARY

According to one aspect of the present disclosure, a camera driving module includes a base, a casing, a lens unit, a magnetic element, a coil, at least one spring and at least one damper agent. The base includes an opening. The casing is disposed on the base and includes a through hole and at least one broadwise notch structure. The through hole corresponds to the opening of the base. The broadwise notch structure is located nearby a periphery of the through hole. The lens unit is movably disposed on the casing and includes at least one protruding structure corresponding to the at least one broadwise notch structure. The protruding structure is located at a periphery of the lens unit. The magnetic element is fixed to the casing and located at an inside the casing. The coil is fixed to the lens unit and located at an outside of the lens unit. The coil faces toward the magnetic element. The spring is disposed on the lens unit. The damper agent is configured to reduce the movement of the lens unit. The damper agent is disposed between the broadwise notch structure and the protruding structure.

According to another aspect of the present disclosure, an image capturing unit includes the aforementioned camera driving module.

According to still another aspect of the present disclosure, a method of manufacturing camera driving module includes the steps of: disposing a spring on a lens unit, the lens unit includes a protruding structure, and the protruding structure is located at a periphery of the lens unit; fixing a magnetic element to a casing, the magnetic element is located at an inside of the casing, and the casing includes a through hole and a broadwise notch structure; fixing a coil to the lens unit, the coil is located at an outside of the casing; disposing the lens unit on either the casing or a base; disposing the casing on the base, the base includes an opening, the through hole of the casing corresponds to the opening of the base, the broadwise notch structure of the casing is located nearby a periphery of the through hole, the protruding structure of the lens unit corresponds to the broadwise notch structure, the lens unit is movable relative to the casing, and the coil faces toward the magnetic element; and disposing a damper agent between the broadwise notch structure of the casing and the protruding structure of the lens unit, the damper agent is configured to reduce movement of the lens unit, and the damper agent is cured via UV irradiation.

According to yet another aspect of the present disclosure, an image capturing unit includes a camera driving module manufactured by the aforementioned method.

According to yet still another aspect of the present disclosure, an smartphone includes one the aforementioned image capturing units.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
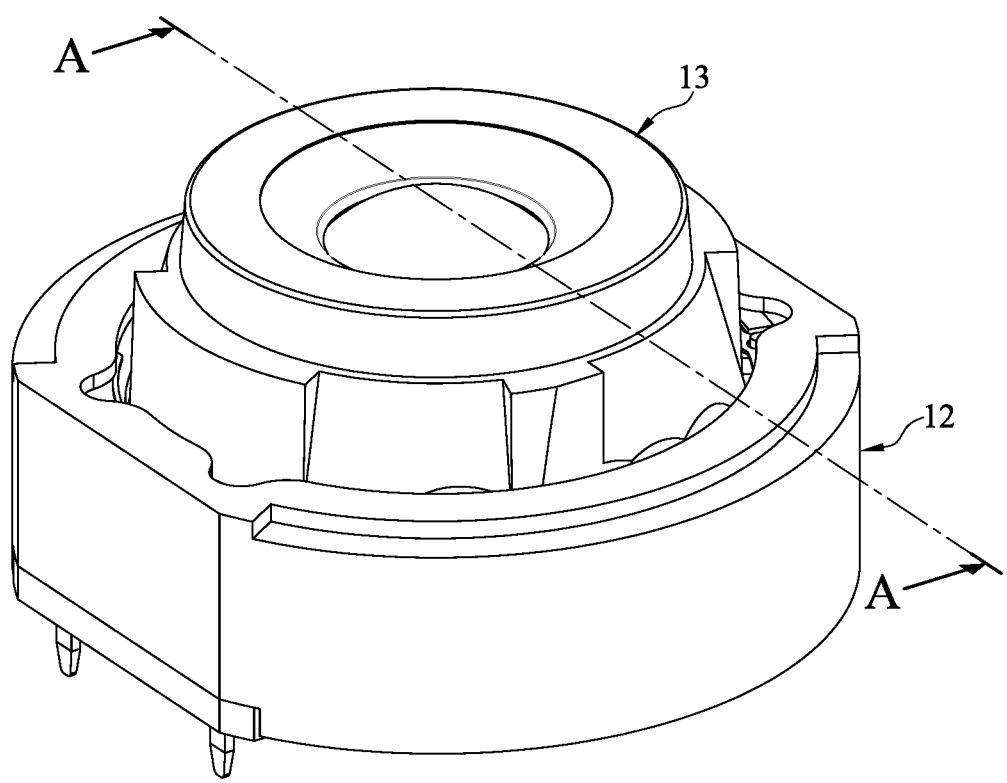
FIG. 1 is a perspective view of a camera driving module according to the 1st embodiment of the present disclosure.

A method of manufacturing a camera driving module is disclosed. Firstly, a coil is fixed to a lens unit, a magnetic element is fixed to a casing, and at least one spring is disposed on the lens unit. The lens unit includes at least one protruding structure located at a periphery of the lens unit, and the casing includes a through hole and at least one broadwise notch structure. The broadwise notch structure is located at a periphery of the through hole. The coil is located at an outside of the lens unit, and the magnetic element is located at an inside of the casing. The magnetic element, for example, includes two permanent magnets which are respectively fixed on two opposite sides of the casing. The spring is configured to bring the lens unit to a focusing position before and after the lens unit captures an image.

Next, the lens unit is disposed on either the casing or a base. In some cases, the lens unit is movably disposed on the base by assembling the spring with the base. In some other cases, the lens unit is movably disposed on the casing by assembling the spring with the casing.

Next, the casing is disposed on the base, such that the coil fixed to the lens unit faces toward the magnetic element fixed to the casing. The base includes an opening corresponding to the through hole of the casing, and the protruding structure of the lens unit corresponds to the broadwise notch structure of the casing. The lens unit is movable relative to the base and the casing.

Next, at least one damper agent is disposed between the broadwise notch structure of the casing and the protruding structure of the lens unit. In some cases, an unsolidified damping material, such as a light cured resin, is dispensed between the broadwise notch structure and the protruding structure. The damping material is cured by UV irradiation so as to be solidified. The solidified damping material is taken as the damper agent to reduce the movement of the lens unit.

Since the casing includes the broadwise notch structure extending from the periphery of the through hole, a part of the lens unit is visible from the broadwise notch structure. The protruding structure of the lens unit is taken as a mark for dispensation, and a damping material dispenser is moved to a prepared dispensing position according to the image recognition of the protruding structure. When the elements of the camera driving module are assembled, a configuration of the protruding structure and the broadwise notch structure is favorable for dispensing the damping material after a focusing capability test for the camera driving module. Therefore, the damper agent can be disposed after the camera driving module passes the focusing capability test so as to reduce the consumption of damping material and meet the requirement of UV irradiation for solidifying the damping material.

When a depth of the broadwise notch structure is d, the following condition can be satisfied: 0.02 [mm]<d<0.80 [mm]. Therefore, a proper depth of the broadwise notch structure is favorable for preventing insufficient capability of the damper agent to reduce the movement of the lens unit due to overly shallow broadwise notch structure as well as preventing inefficient manufacture of the casing process due to overly deep broadwise notch structure. Preferably, the following condition can also be satisfied: 0.15 [mm]<d<0.60 [mm]. Therefore, it is favorable for a proper dispensing range of unsolidified damping material. It is difficult to control the dispensing position when the dispensing range is overly small. Furthermore, one side of the dispensing range is far from the protruding structure when the dispensing range is overly large, such that an excessive amount of damping material will be dispensed.

The broadwise notch structure of the casing can include an arc form. Therefore, it is favorable for easily forming a notch structure in arc shape so as to reduce manufacturing cost of the casing.

When a curvature radius of the arc form of the broadwise notch structure is R, and a diameter of the protruding structure is $\phi$, the following condition can be satisfied: $0.5<R/\phi<2.3$. Therefore, a proper gap between the broadwise notch structure and the protruding structure is favorable for preventing an overflow of the damping material due to overly small gap as well as preventing the consumption of damping material due to overly large gap. Preferably, the following condition can also be satisfied: $0.7<R/\phi<1.8$. Therefore, it is favorable for controlling the amount of damping material for dispensation so as to reduce manufacturing cost.

According to the present disclosure, the lens unit can include a carrier and a lens assembly. The carrier is movably disposed on the casing and includes the protruding structure. The carrier further includes an object-side portion and at least three inner edge surfaces. The object-side portion includes an object-side central aperture. The inner edge surfaces have different diameters, and each of the diameters of the inner edge surfaces is larger than a diameter of the object-side central aperture. The protruding structure extends toward the through hole of the casing. The lens assembly includes at least three lens elements having different diameters. A central axis of the lens assembly corresponds to the object-side central aperture of the carrier. The lens assembly is disposed in the carrier, and the carrier and the lens assembly are jointly movable relative to the base. Therefore, compared to the assembly of the carrier and a barrel in a conventional lens unit, the lens unit is integral with the carrier in the present disclosure so as to be favorable for reducing a size of the object-side portion of the lens unit, thereby preventing light leakage due to the broadwise notch structure nearby the through hole; moreover, the integration of the lens unit and the carrier is also favorable for the carrier sticking out from the through hole of the casing so as to obtain a small gap between the broadwise notch structure and the protruding structure in a vertical direction of the lens unit so as to obtain an easier dispensation of the damping material.

The object-side portion of the carrier can include an annular wall surrounding the object-side central aperture. The annular wall can include two slopes and a tip end structure formed by the two slopes. An angle between each of the two slopes and the central axis of the lens assembly is larger than 0 degree and smaller than 90 degrees. Therefore, the carrier, which is a single piece, is favorable for eliminating reflected stray light so as to improve image quality. Moreover, it is also favorable for improving the manufacturing quality of carrier so as to prevent flash or flat surface on the edge of the object-side central aperture from decreasing image quality.

A part of the carrier surrounded by the coil can be located in the casing, and the object-side portion of the carrier can be exposed to outside. Therefore, the carrier passing through the through hole of the casing is favorable for reducing a height of the casing so as to keep the camera driving module compact.

The at least one spring of the camera driving module can include an upper spring and at least one lower spring. The upper spring is disposed on a top of the lens unit, and the lower spring is disposed on a bottom of the lens unit. Therefore, the springs are favorable for supporting the lens unit in the casing and providing multiple degrees of freedom for the movement of the lens unit relative to the casing. The upper spring is closer to the through hole of the casing than the lower spring.

The at least one lower spring can include a first lower spring and a second lower spring which are separated from each other. The first lower spring and the second lower spring are on a same horizontal plane. Therefore, it is favorable for taking the lower springs as paths for transmitting the electric signals of a voice coil motor (VCM).

When the number of the broadwise notch structure of the casing is Nn, the following condition can be satisfied: 2≤Nn≤10. Therefore, the proper number of the broadwise notch structure is favorable for reducing the difficulty of manufacturing the casing as well as enhancing dispensing quality of the damper agent for absorbing vibrations of the lens unit.

When the number of the damper agent is Na, the following condition can be satisfied: 2≤Na≤14. Therefore, the proper number of the damper agent is favorable for providing a proper dispensing range so as to obtain a balance between high manufacturing rate of the camera driving module and proper dispensing quality of the damper agent.

The damper agent can be made of UV curing material. Therefore, it is favorable for reducing solidification process time so as to improve manufacturing efficiency.

When the height of the casing is Zy, and a height of the carrier of the lens unit is Zc, the following condition can be satisfied: 1.35<Zc/Zy<5.0. Therefore, it is favorable for reducing the gap between the broadwise notch structure and the protruding structure in the vertical direction of the lens unit so as to obtain an easier dispensation of the damping material.

According to the present disclosure, some springs can be disposed on the base of the camera driving module, and the other springs can be disposed on a frame part.

According to the present disclosure, the protruding structure of the lens unit is exposed to outside from the through hole of the casing in a direction parallel to an optical axis; that is, the protruding structure is able to be irradiated by external light rays from the through hole.

According to the present disclosure, the aforementioned features and conditions can be utilized in numerous combinations so as to achieve corresponding effects.

According to the above description of the present disclosure, the following specific embodiments are provided for further explanation.

1st Embodiment

Figure 2:
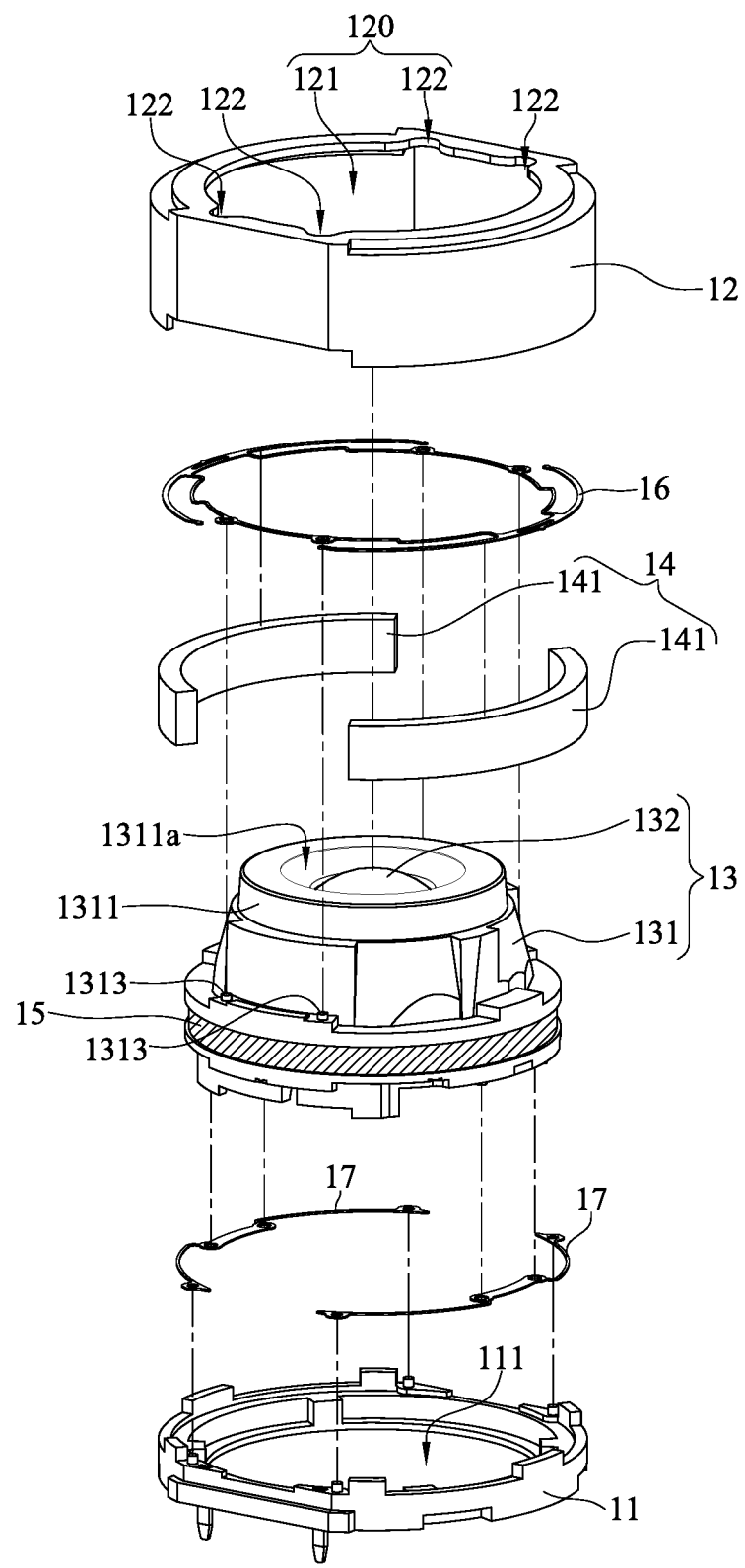
FIG. 2 is an exploded view of the camera driving module in FIG. 1.
Figure 3:
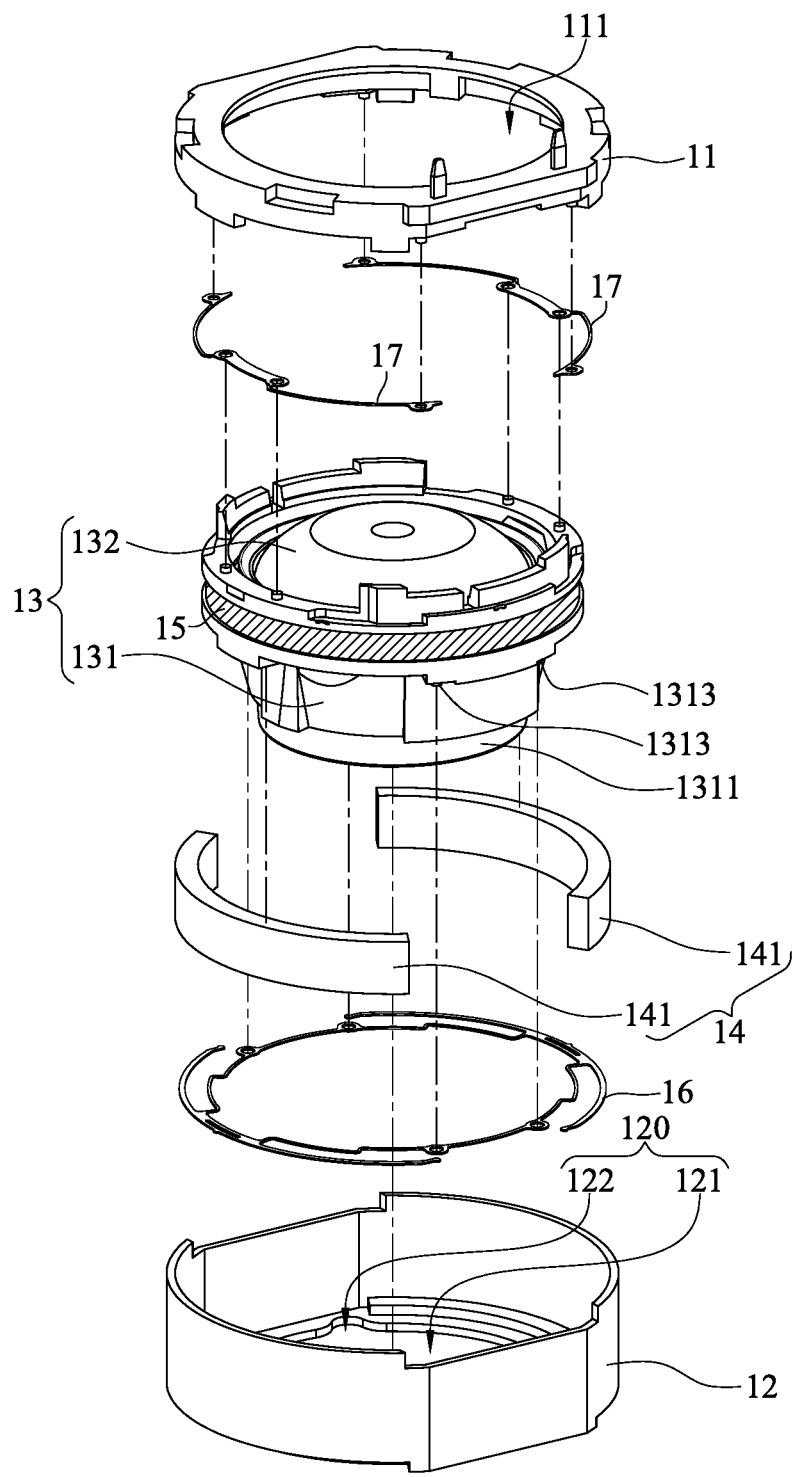
FIG. 3 is another exploded view of the camera driving module in FIG. 1.
Figure 4:
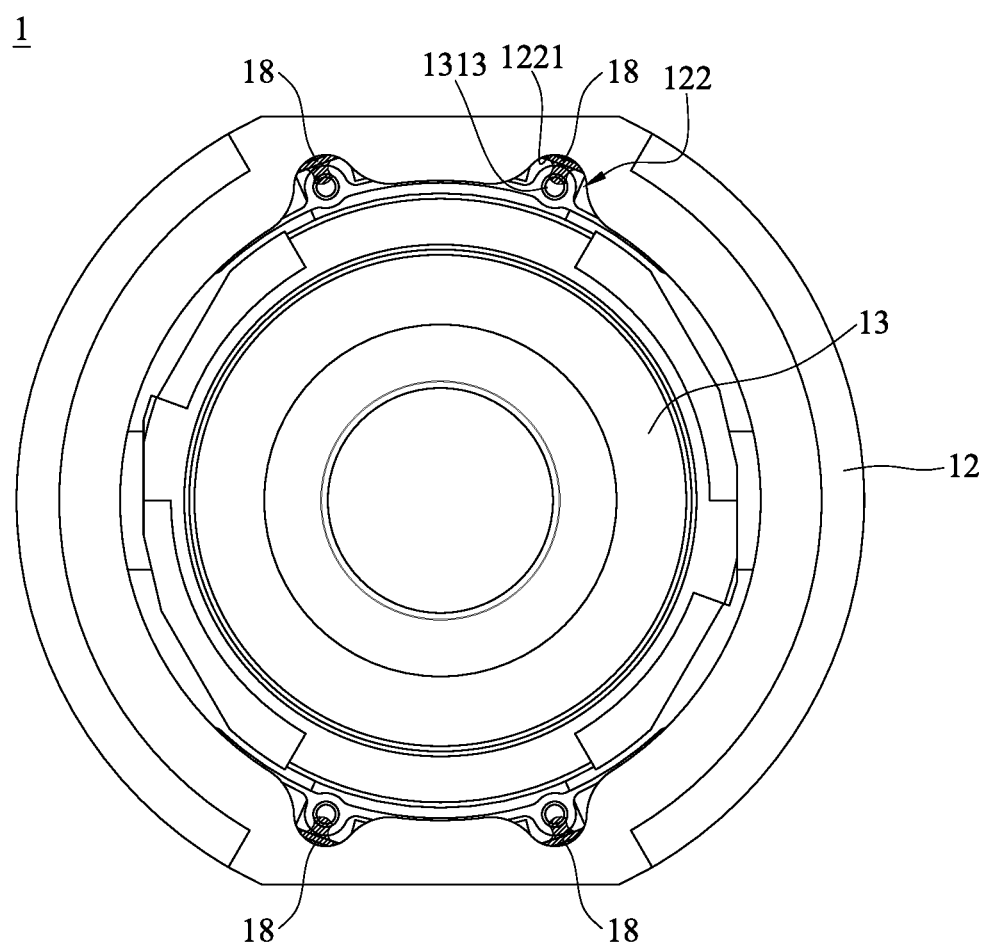
FIG. 4 is a top view of the camera driving module in FIG. 1.

FIG. 1 is a perspective view of a camera driving module according to the 1st embodiment of the present disclosure. FIG. 2 is an exploded view of the camera driving module in FIG. 1. FIG. 3 is another exploded view of the camera driving module in FIG. 1. FIG. 4 is a top view of the camera driving module in FIG. 1. In this embodiment, a camera driving module includes a base 11, a casing 12, a lens unit 13, a magnetic element 14, a coil 15, an upper spring 16, two lower springs 17 and four damper agents 18.

The base 11 is, for example but not limited to, a metal ring. The base 11 includes an opening 111. The casing 12 is, for example but not limited to, a metal housing disposed on the base 11. The casing 12 includes a through hole 121 and four broadwise notch structures 122. The through hole 121 corresponds to the opening 111 of the base 11, and the broadwise notch structures 122 are located nearby the periphery of the through hole 121. The through hole 121 and the broadwise notch structures 122 are connected together so as to jointly form a non-circular aperture 120. Each of the broadwise notch structures 122 includes an arc form 1221.

Figure 5:
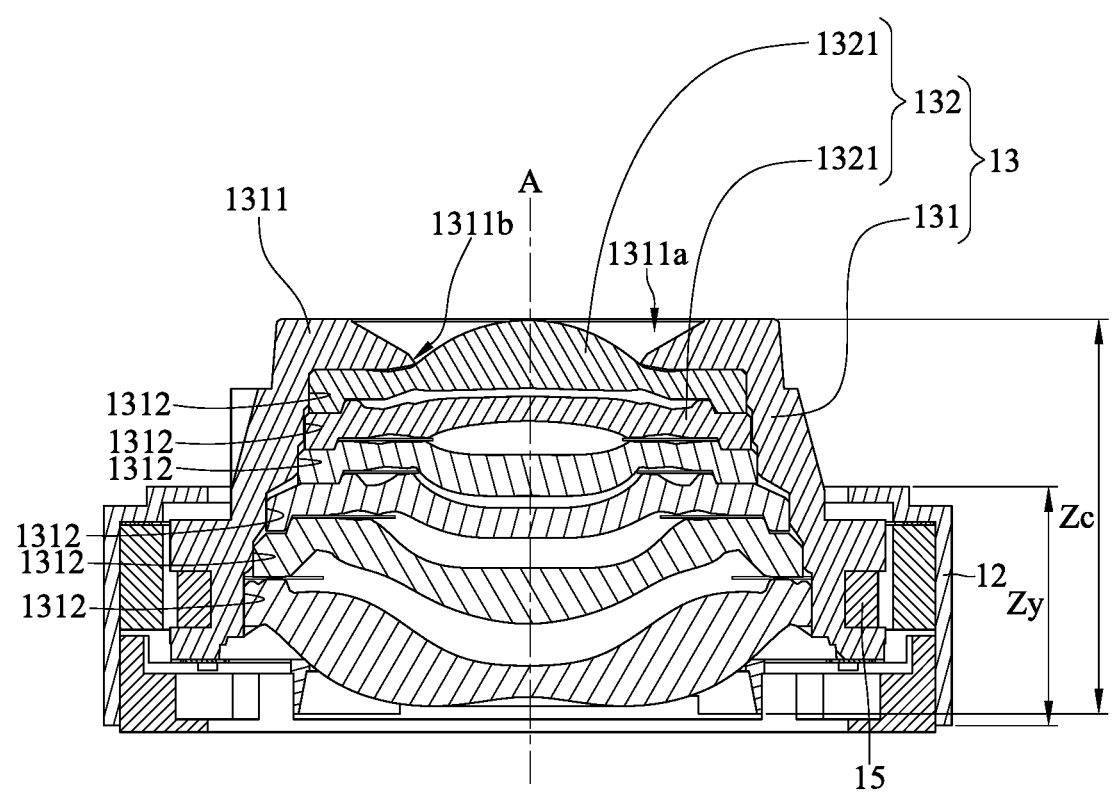
FIG. 5 is a cross-sectional view of the camera driving module in FIG. 1 along line A-A.
Figure 6:
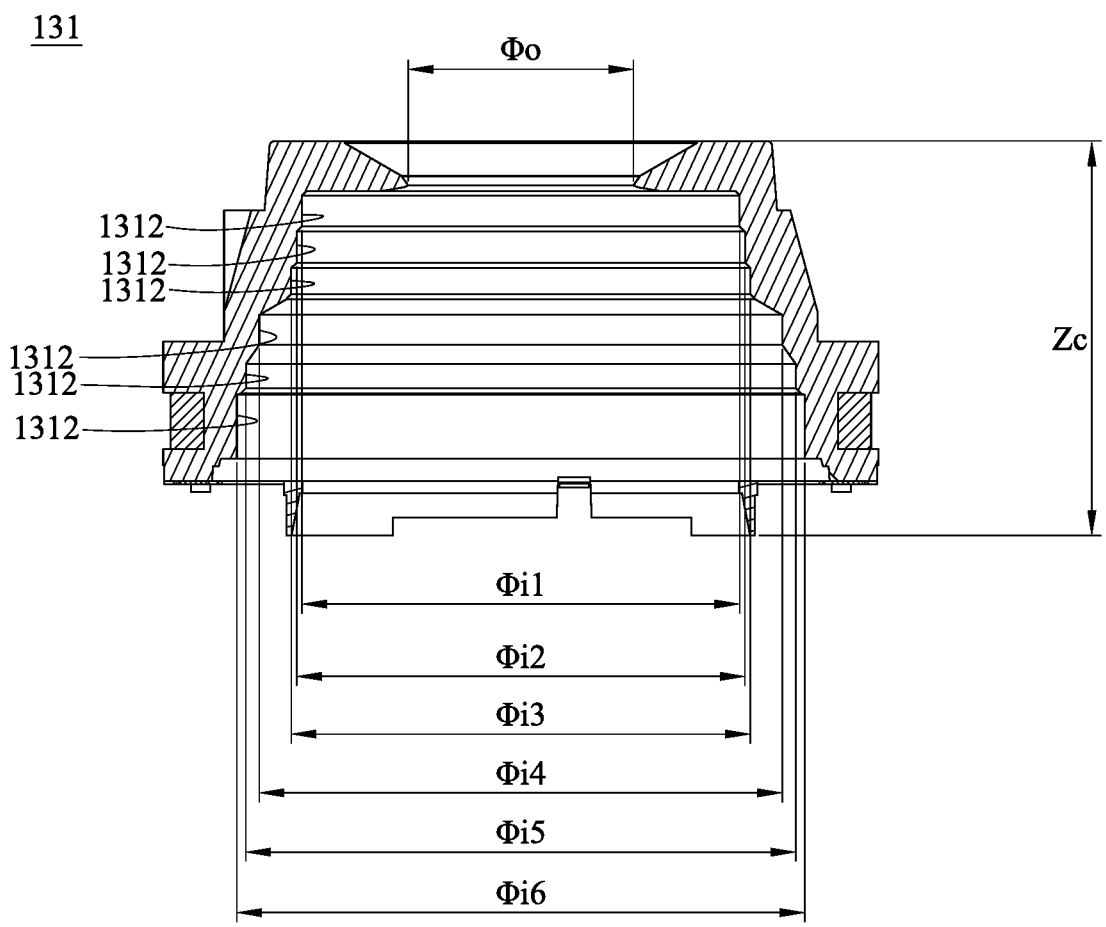
FIG. 6 is a cross-sectional view of a carrier of the camera driving module in FIG. 5.
Figure 7:
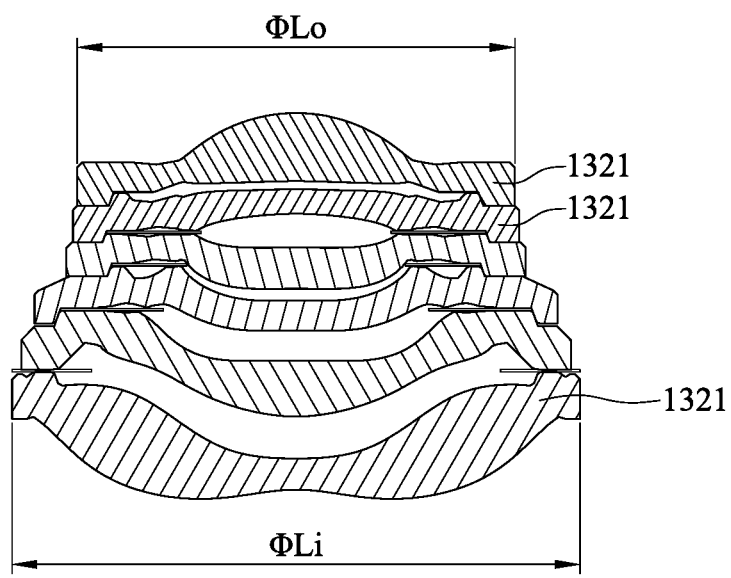
FIG. 7 is a cross-sectional view of a lens assembly of the camera driving module in FIG. 5.

The lens unit 13 is movably disposed on the casing 12. In detail, the lens unit 13 includes a carrier 131 and a lens assembly 132. FIG. 5 is a cross-sectional view of the camera driving module in FIG. 1 along line A-A. FIG. 6 is a cross-sectional view of a carrier of the camera driving module in FIG. 5. FIG. 7 is a cross-sectional view of a lens assembly of the camera driving module in FIG. 5. The carrier 131 is movable relative to the casing 12, and the carrier 131 includes an object-side portion 1311 and six circular inner edge surfaces 1312. The object-side portion 1311 includes an object-side central aperture 1311a. The inner edge surfaces 1312 have different diameters, and the diameters of the inner edge surfaces 1312 are larger than a diameter of the object-side central aperture 1311a. The carrier 131 further includes four protruding structures 1313 extending toward the through hole 121 of the casing 12. The four protruding structures 1313 correspond to the four broadwise notch structures 122, respectively.

Figure 8:
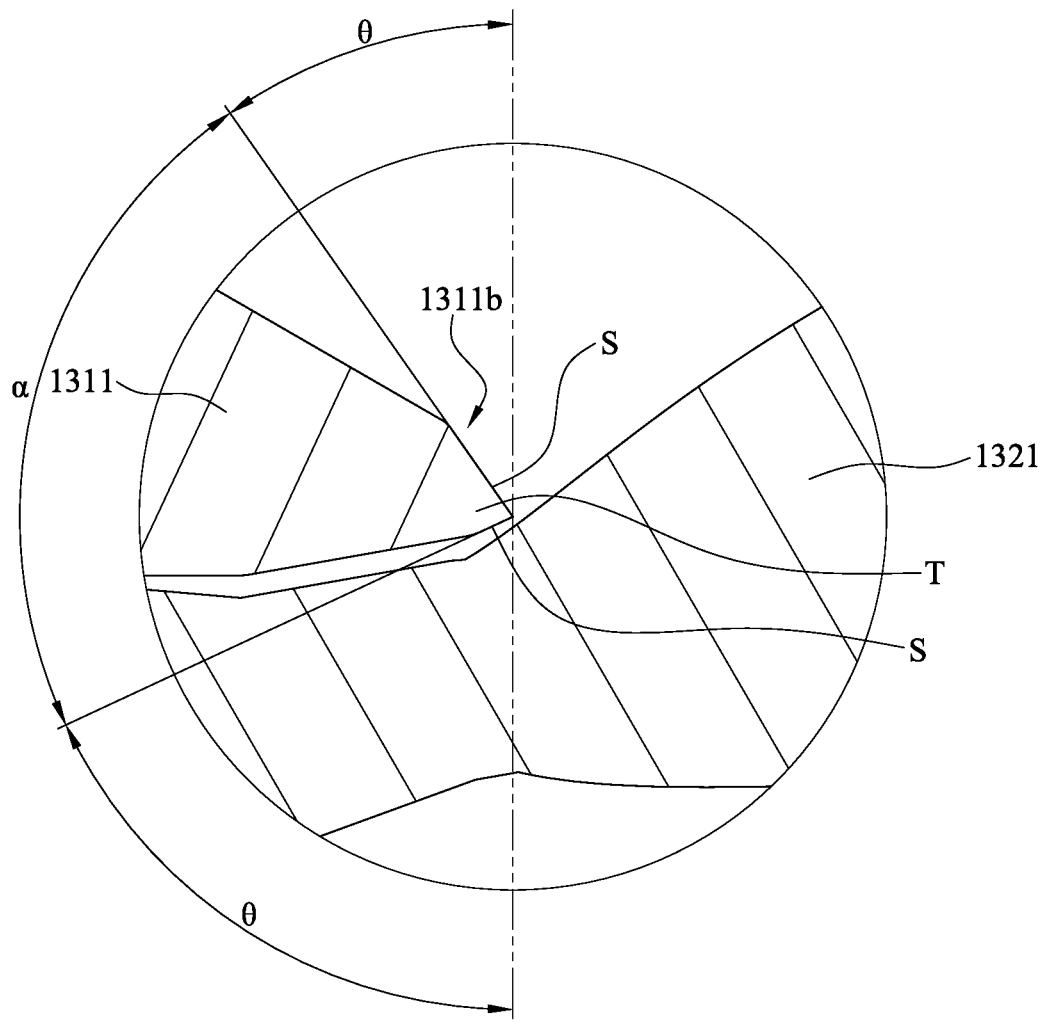
FIG. 8 is an enlarged view of the camera driving module in FIG. 5.

FIG. 8 is an enlarged view of the camera driving module in FIG. 5. The object-side portion 1311 of the carrier 131 further includes an annular wall 1311b surrounding the object-side central aperture 1311a. The annular wall 1311b includes two slopes S and a tip end structure T formed by the two slopes S. An angle between each of the two slopes S and a central axis A of the lens assembly 132 is larger than 0 degree and smaller than 90 degrees. As shown in FIG. 8, the angle θ between the slope S and a reference line, which is parallel to the central axis A, is larger than 0 degree and smaller than 90 degrees. The angle α between the two slopes S is about 80 degrees.

The lens assembly 132 includes six lens elements 1321 having different diameters. The central axis A of the lens assembly 132 corresponds to the object-side central aperture 1311a of the carrier 131. The lens assembly 132 is disposed in the carrier 131. The carrier 131 and the lens assembly 132 are jointly movable relative to the base 11.

The magnetic element 14 includes two magnets 141 located at an inside of the casing 12. The two magnets 141 are respectively fixed on two opposite sides of the casing 12. The coil 15 located at an outside of the carrier 131 of the lens unit 13, and the coil 15 faces toward the magnetic element 14. A part of the carrier 131, which is surrounded by the coil 15, is located in the casing 12, and the object-side portion 1311 of the carrier 131 is exposed to outside. In this embodiment, the magnetic element 14 and the coil 15 are two elements in a voice coil motor utilized for image focusing.

The upper spring 16 and the lower spring 17 are disposed on the lens unit 13. In detail, the upper spring 16 is disposed on the top of the lens unit 13, and the lower springs 17 are disposed on the bottom of the lens unit 13. The lower springs 17 are separated from each other and on a same horizontal plane.

Figure 9:
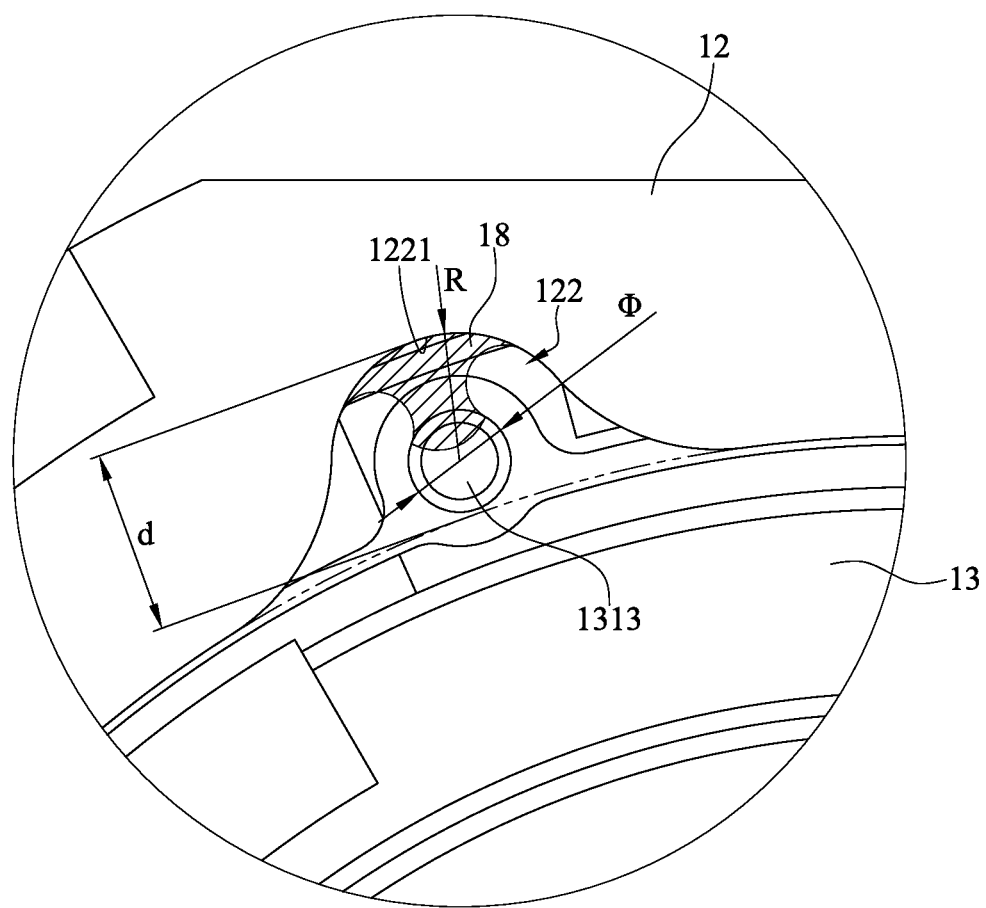
FIG. 9 is an enlarged view of the camera driving module in FIG. 4.

The damper agent 18, for example but not limited to, is a solidified photopolymer configured to reduce the movement of the lens unit 13. FIG. 9 is an enlarged view of the camera driving module in FIG. 4. Each of the damper agents 18 are disposed between one of the broadwise notch structures 122 of the casing 12 and one of the protruding structure 1313 of the lens unit 13.

When a depth of the broadwise notch structure 122 of the casing 12 is d, the following condition is satisfied: d=0.43 millimeters (mm).

When a curvature radius of the arc form 1221 of the broadwise notch structure 122 is R, and a diameter of the protruding structure 1313 of the lens unit 13 is $\phi$, the following condition is satisfied: R/$\phi$=1.25.

When the number of the broadwise notch structure 122 is Nn, the following condition is satisfied: Nn=4.

When the number of the damper agent 18 is Na, the following condition is satisfied: Na=4.

When a height of the casing 12 is Zy, and a height of the carrier 131 of the lens unit 13 is Zc, the following condition is satisfied: Zc/Zy=1.65.

When the diameter of the object-side central aperture 1311a of the carrier 131 is $\phi$o, the following condition is satisfied: $\phi$o=2.11 mm.

In this embodiment, the six inner edge surfaces 1312 of the carrier 131 are, in order from the object-side central aperture 1311a to the bottom of the carrier 131, a first inner edge surface, a second inner edge surface, a third inner edge surface, a fourth inner edge surface, a fifth inner edge surface and a sixth inner edge surface. When a diameter of the first inner edge surface is $\phi$i1, a diameter of the second inner edge surface is $\phi$i2, a diameter of the third inner edge surface is $\phi$i3, a diameter of the fourth inner edge surface is $\phi$i4, a diameter of the fifth inner edge surface is $\phi$i5, and a diameter of the sixth inner edge surface is $\phi$i6, the following conditions are satisfied: $\phi$i1=4.1 mm; $\phi$i2=4.2 mm; $\phi$i3=4.3 mm; $\phi$i4=4.9 mm; $\phi$i5=5.15 mm; and $\phi$i6=5.32 mm.

The six lens elements 1321 of the lens assembly 132 are, from the object-side central aperture 1311a to the bottom of the carrier 131, a first lens element, a second lens element, a third lens element, a fourth lens element, a fifth lens element and a sixth lens element. When a diameter of the first lens element is $\phi$Lo, and a diameter of the sixth lens element is $\phi$Li, the following conditions are satisfied: $\phi$Lo=4.1 mm; and $\phi$Li=5.32 mm.

2nd Embodiment

Figure 10:
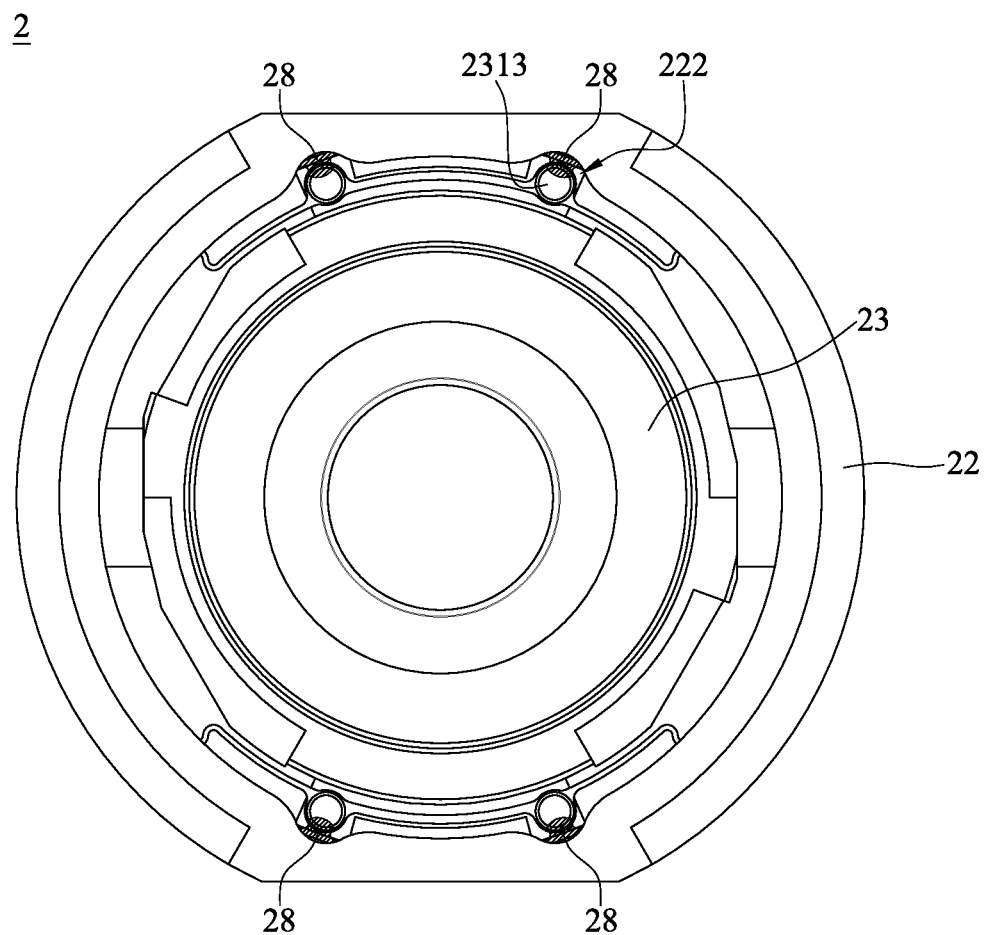
FIG. 10 is a top view of a camera driving module according to the 2nd embodiment of the present disclosure.
Figure 11:
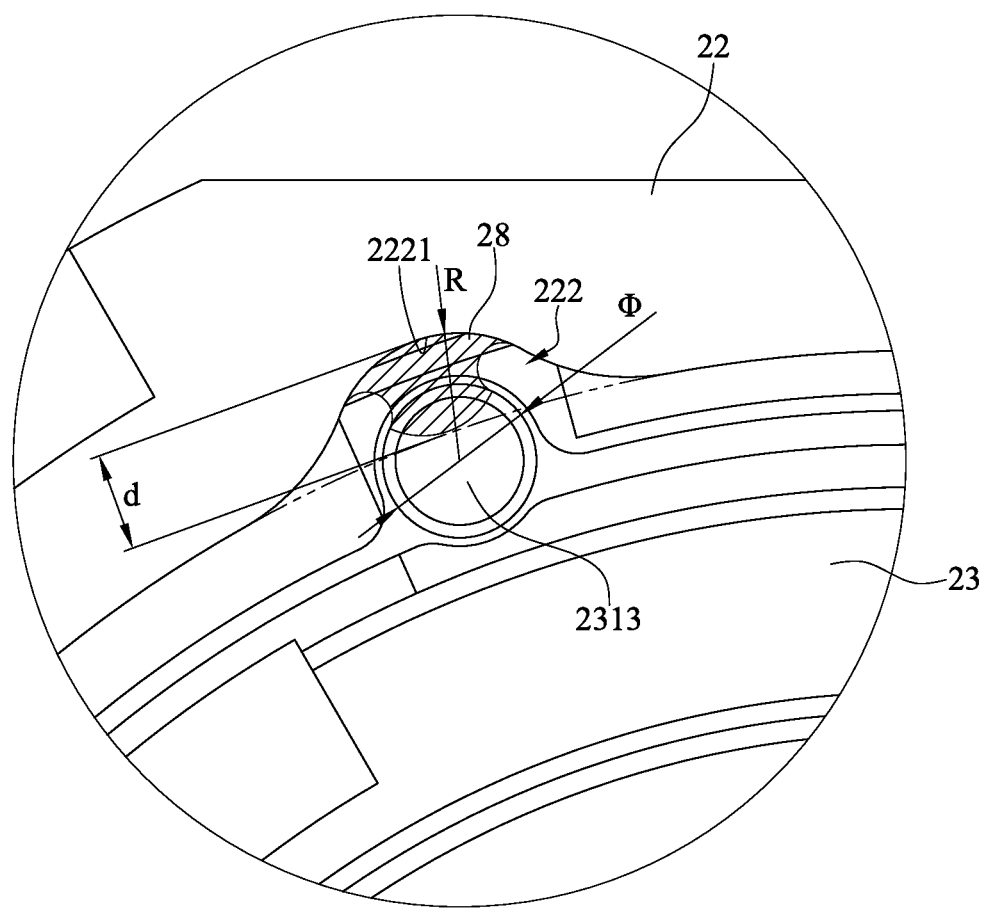
FIG. 11 is an enlarged view of the camera driving module in FIG. 10.

FIG. 10 is a top view of a camera driving module according to the 2nd embodiment of the present disclosure. FIG. 11 is an enlarged view of the camera driving module in FIG. 10. In this embodiment, a camera driving module 2 includes a casing 22, a lens unit 23 and multiple damper agent 28.

The casing 22 includes multiple broadwise notch structures 222. Each of the broadwise notch structures 222 includes an arc form 2221. The lens unit 23 includes multiple protruding structures 2313. The protruding structures 2313 corresponds to the broadwise notch structures 222, respectively. The damper agent 28 is disposed between the broadwise notch structure 222 of the casing 22 and the protruding structure 2313 of the lens unit 23.

When a depth of the broadwise notch structure 222 of the casing 22 is d, the following condition is satisfied: d=0.23 mm.

When a curvature radius of the arc form 2221 of the broadwise notch structure 222 is R, and a diameter of the protruding structure 2313 of the lens unit 23 is $\phi$, the following condition is satisfied: R/$\phi$=0.83.

When the number of the broadwise notch structure 222 is Nn, the following condition is satisfied: Nn=4.

When the number of the damper agent 28 is Na, the following condition is satisfied: Na=4.

3rd Embodiment

Figure 12:
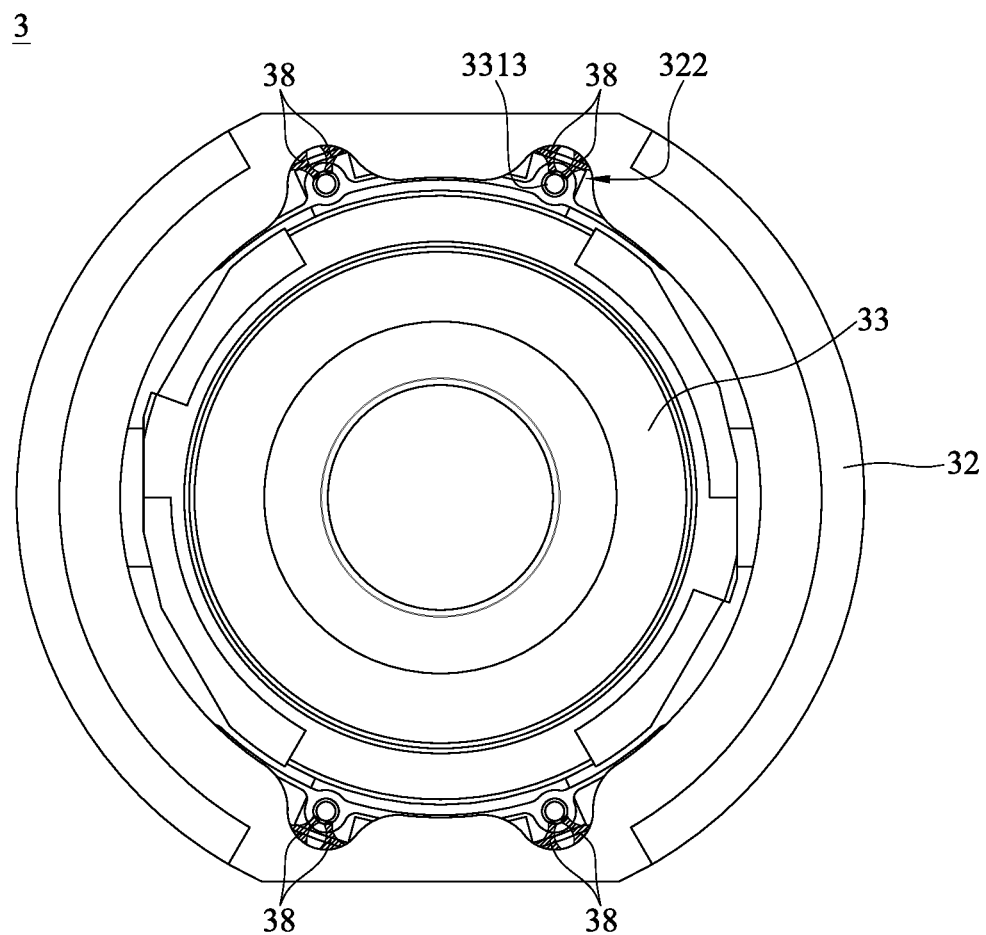
FIG. 12 is a top view of a camera driving module according to the 3rd embodiment of the present disclosure.
Figure 13:
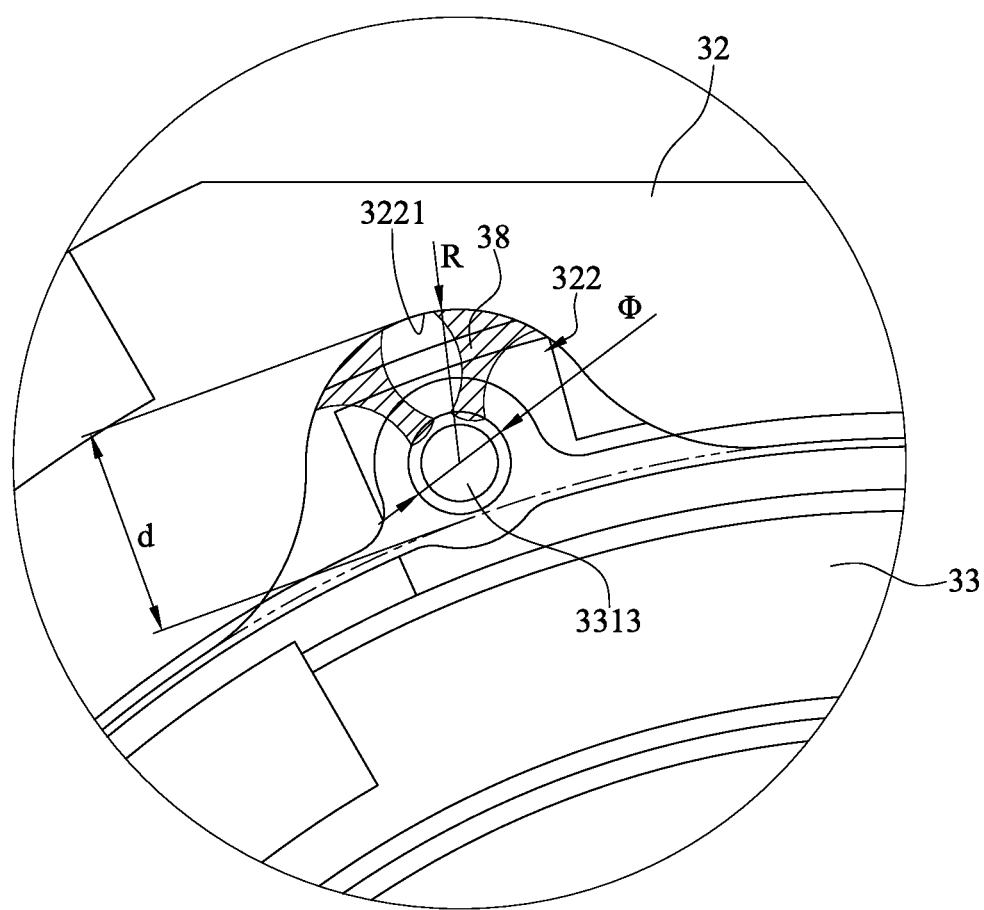
FIG. 13 is an enlarged view of the camera driving module in FIG. 12.

FIG. 12 is a top view of a camera driving module according to the 3rd embodiment of the present disclosure. FIG. 13 is an enlarged view of the camera driving module in FIG. 12. In this embodiment, a camera driving module 3 includes a casing 32, a lens unit 33 and multiple damper agents 38.

The casing 32 includes multiple broadwise notch structures 322. Each of the broadwise notch structures 322 includes an arc form 3221. The lens unit 33 includes multiple protruding structures 3313. The protruding structures 3313 corresponds to the broadwise notch structures 322 of the casing 32, respectively. The damper agent 38 is disposed between the broadwise notch structure 322 of the casing 32 and the protruding structure 3313 of the lens unit 33.

When a depth of the broadwise notch structure 322 of the casing 32 is d, the following condition is satisfied: d=0.49 mm.

When a curvature radius of the arc form 3221 of the broadwise notch structure 322 is R, and a diameter of the protruding structure 3313 of the lens unit 33 is $\phi$, the following condition is satisfied: R/$\phi$=1.5.

When the number of the broadwise notch structure 322 is Nn, the following condition is satisfied: Nn=4.

When the number of the damper agent 38 is Na, the following condition is satisfied: Na=8.

4th Embodiment

Figure 14:
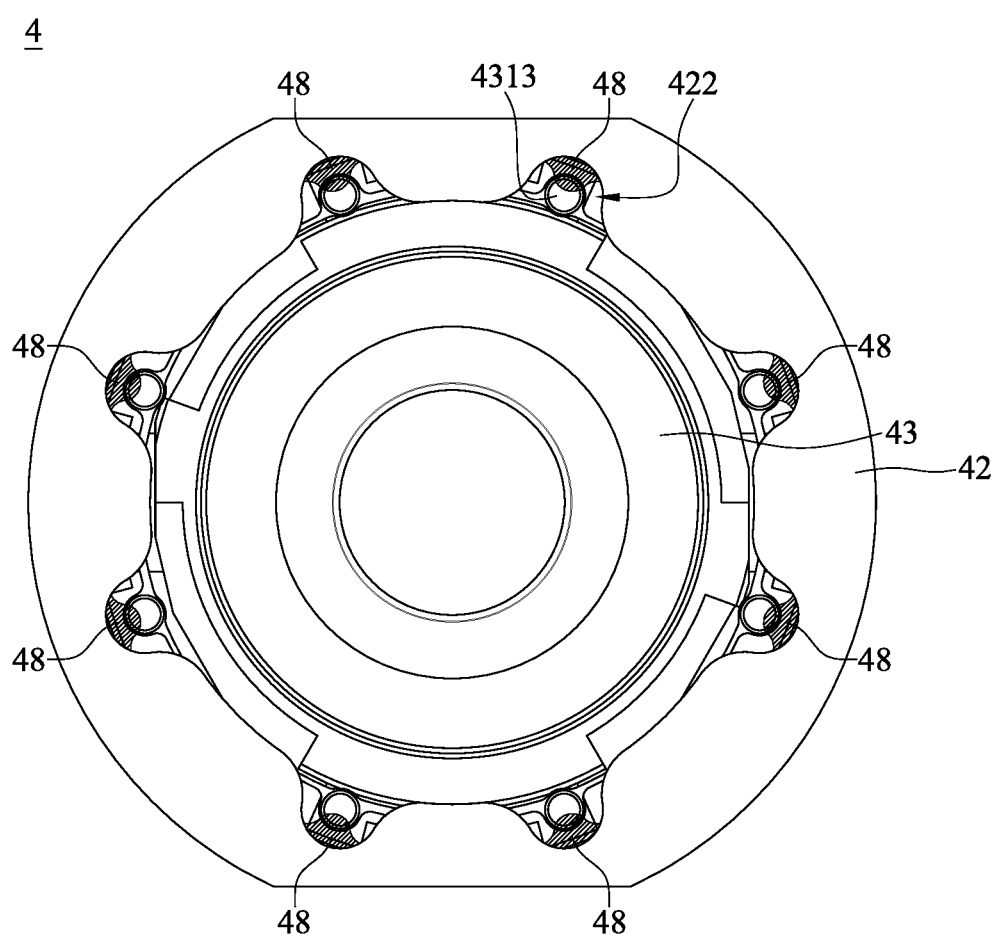
FIG. 14 is a top view of a camera driving module according to the 4th embodiment of the present disclosure.
Figure 15:
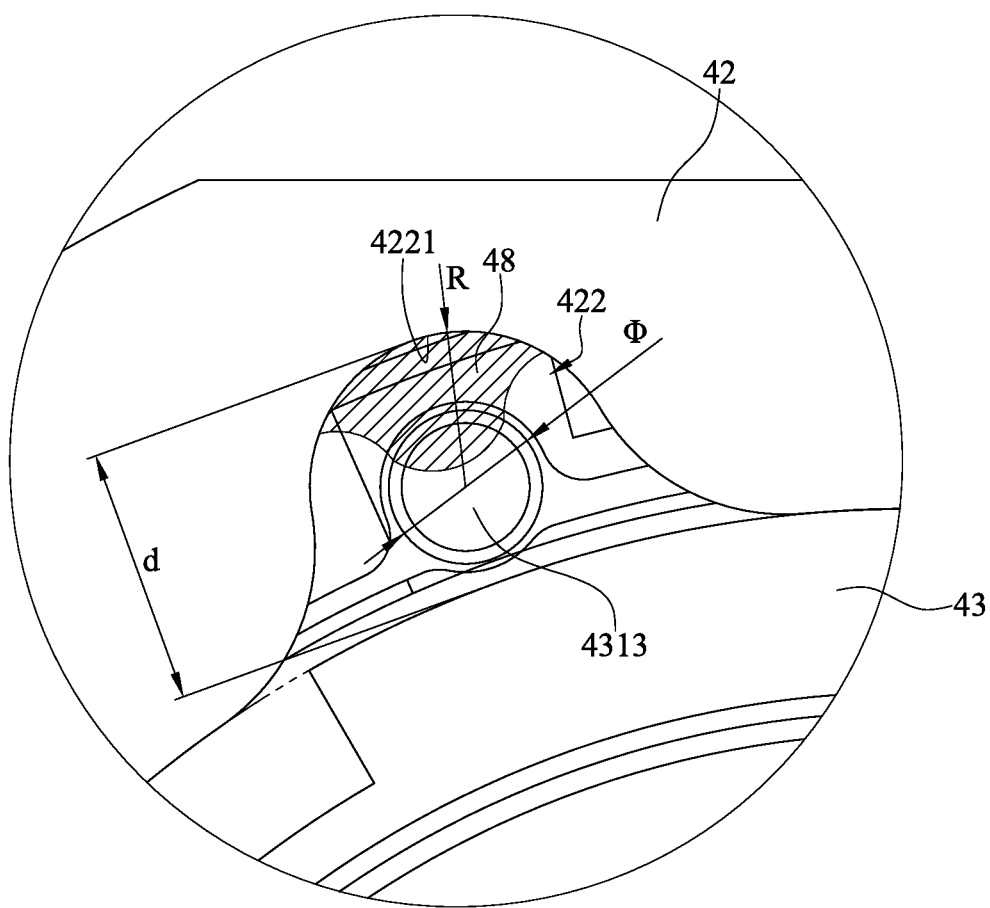
FIG. 15 an enlarged view of the camera driving module in FIG. 14.

FIG. 14 is a top view of a camera driving module according to the 4th embodiment of the present disclosure. FIG. 15 an enlarged view of the camera driving module in FIG. 14. In this embodiment, a camera driving module 4 includes a casing 42, a lens unit 43 and multiple damper agents 48.

The casing 42 includes multiple broadwise notch structures 422. Each of the broadwise notch structures 422 includes an arc form 4221. The lens unit 43 includes multiple protruding structures 4313. The protruding structures 4313 corresponds to the broadwise notch structures 422 of the casing 42, respectively. The damper agent 48 is disposed between the broadwise notch structure 422 of the casing 42 and the protruding structure 4313 of the lens unit 43.

When a depth of the broadwise notch structure 422 of the casing 42 is d, the following condition is satisfied: d=0.60 mm.

When a curvature radius of the arc form 4221 of the broadwise notch structure 422 is R, and a diameter of the protruding structure 4313 of the lens unit 43 is $\phi$, the following condition is satisfied: R/$\phi$=1.01.

When the number of the broadwise notch structure 422 is Nn, the following condition is satisfied: Nn=8.

When the number of the damper agent 48 is Na, the following condition is satisfied: Na=8.

5th Embodiment

Figure 16:
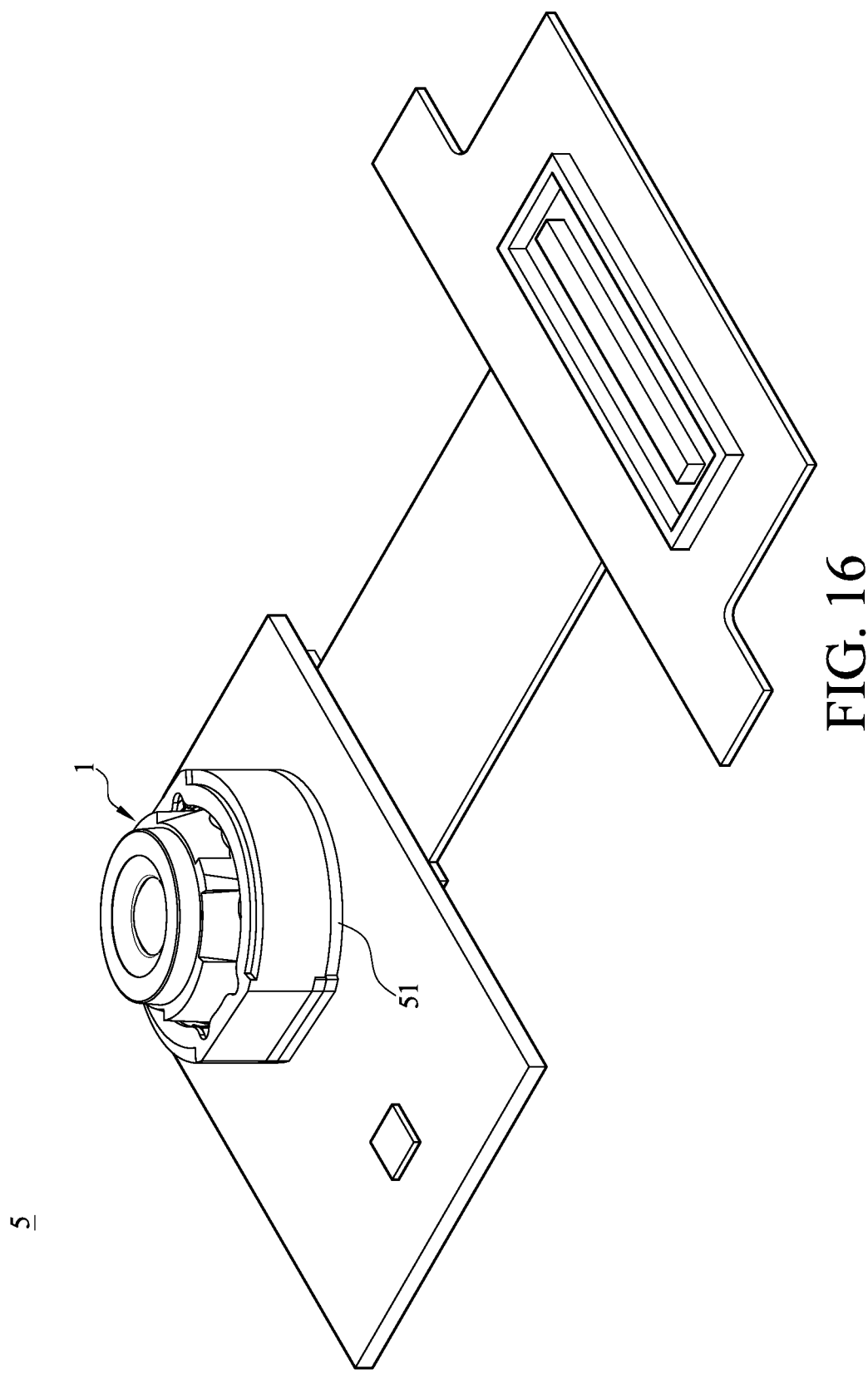
FIG. 16 is a perspective view of an image capturing unit according to the 5th embodiment of the present disclosure.

FIG. 16 is a perspective view of an image capturing unit according to the 5th embodiment of the present disclosure.

In this embodiment, an image capturing unit 5 is a camera module including the camera driving module 1 disclosed in the 1st embodiment and an image sensor 51. The imaging light converges in the camera driving module 1 to generate an image on the image sensor 51, and the generated image is then digitally transmitted to other electronic component for further processing.

6th Embodiment

Figure 17:
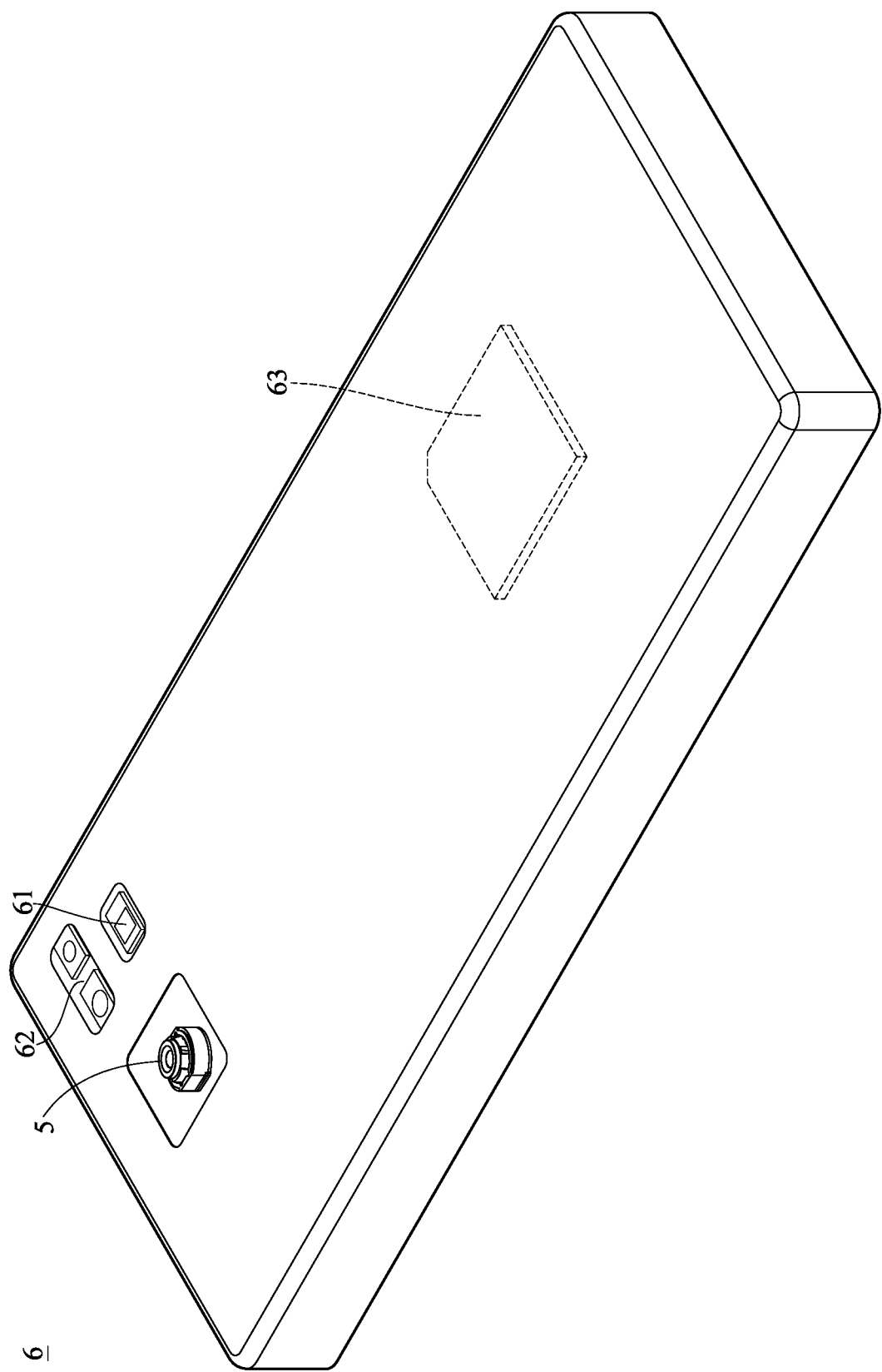
FIG. 17 is a perspective view of a smartphone according to the 6th embodiment of the present disclosure.
Figure 18:
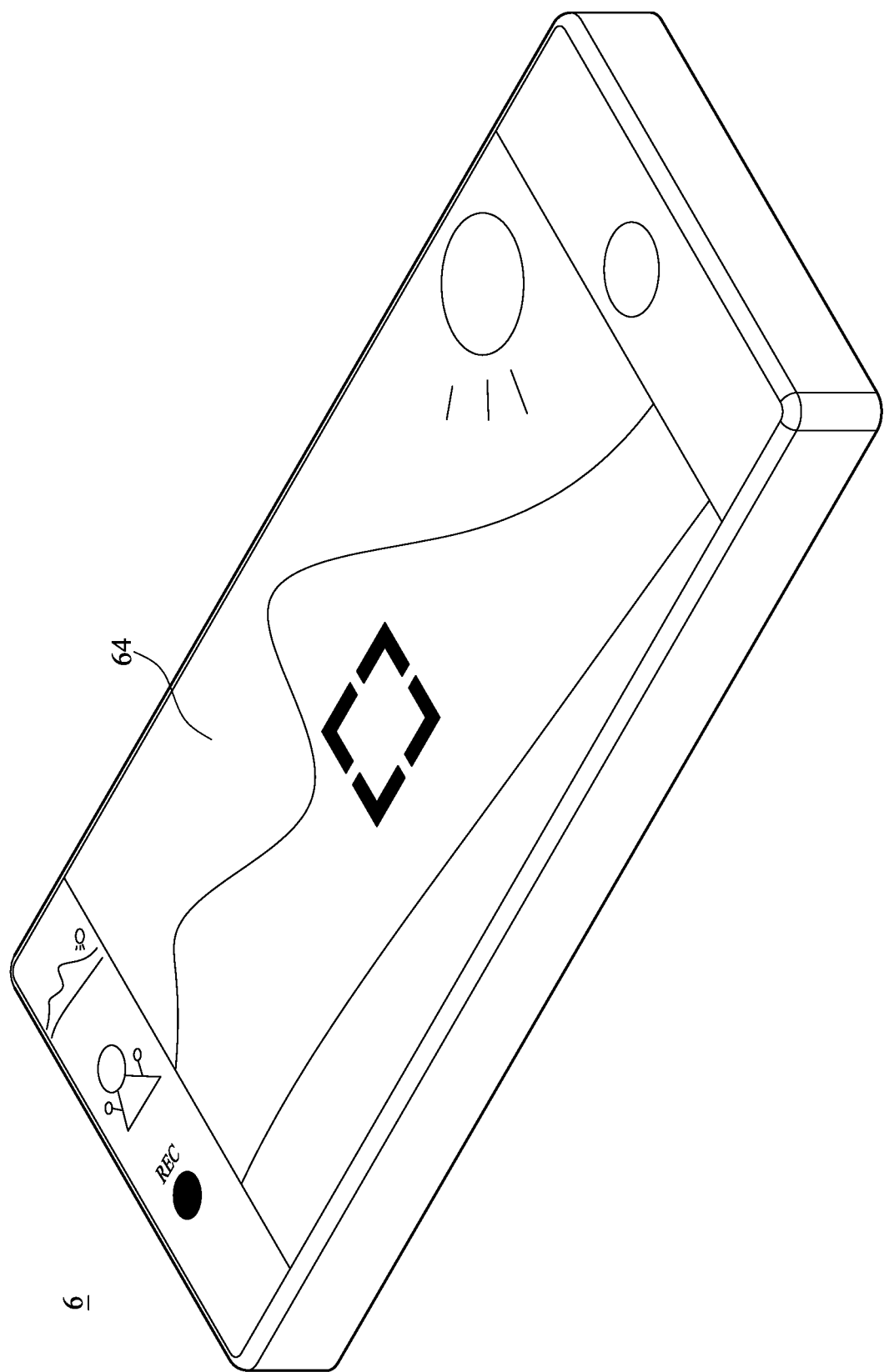
FIG. 18 is another perspective view of the smartphone device in FIG. 17.

FIG. 17 is a perspective view of a smartphone according to the 6th embodiment of the present disclosure. FIG. 18 is another perspective view of the smartphone device in FIG. 17. In this embodiment, an electronic device 6 is a smartphone including the image capturing unit 5 disclosed in the 5th embodiment, a flash module 61, a focus assist module 62, an image signal processor 63, a user interface 64 and an image software processor.

When a user captures images of an object, the light rays converge in the image capturing unit 5 to generate an image, and the flash module 61 is activated for light supplement. The focus assist module 62 detects the object distance of the imaged object to achieve fast auto focusing. The image signal processor 63 is configured to optimize the captured image to improve image quality. The light beam emitted from the focus assist module 62 can be either conventional infrared or laser. The user interface 64 can be a touch screen or a physical button. The user is able to interact with the user interface 64 and the image software processor having multiple functions to capture images and complete image processing. The image processed by the image software processor can be displayed on the user interface 64.

The smartphone in this embodiment is only exemplary for showing the image capturing unit 5 of the present disclosure installed in an electronic device, and the present disclosure is not limited thereto. The image capturing unit 5 can be optionally applied to optical systems with a movable focus. Furthermore, the optical imaging lens assembly of the image capturing unit 5 features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that the present disclosure shows different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A camera driving module, comprising:
a base comprising an opening;
a casing disposed on the base, the casing comprising a through hole, and the through hole corresponding to the opening of the base;
a lens unit movably disposed at an inside of the casing, the lens unit comprising a carrier movably disposed on the casing, the carrier comprising at least one protruding structure corresponding to the through hole, the at least one protruding structure being located at a periphery of the lens unit;
a coil fixed to the lens unit and located at an outside of the lens unit;
a magnetic element located at the inside of the casing, the magnetic element facing toward the coil;
at least one spring disposed on the lens unit; and
at least one damper agent configured to damp movement of the lens unit, and the at least one damper agent being disposed between the through hole and the at least one protruding structure,
wherein a height of the casing is Zy, a height of the carrier is Zc, and the following condition is satisfied:

$1.35<Zc/Zy<5.0$.

2. The camera driving module of claim 1, wherein:
the carrier comprises an object-side portion, at least three inner edge surfaces and the at least one protruding structure, the object-side portion comprises an object-side central aperture, the at least three inner edge surfaces have different diameters which are larger than a diameter of the object-side central aperture, the least one protruding structure extends toward the through hole of the casing, the lens unit comprises a lens assembly which comprises at least three lens elements having different diameters, a central axis of the lens assembly corresponds to the object-side central aperture of the carrier, the lens assembly is disposed in the carrier, and the carrier and the lens assembly are jointly movable relative to the base.

3. The camera driving module of claim 2, wherein the object-side portion of the carrier further comprises an annular wall surrounding the object-side central aperture, the annular wall comprises two slopes and a tip end structure formed by the two slopes, and an angle between each of the two slopes and the central axis of the lens assembly is larger than 0 degree and smaller than 90 degrees.

4. The camera driving module of claim 3, wherein a part of the carrier surrounded by the coil is located in the casing, and the object-side portion of the carrier is exposed to outside.

5. The camera driving module of claim 1, wherein the at least one spring comprises an upper spring and at least one lower spring, the upper spring is disposed on a top of the lens unit, and the at least one lower spring is disposed on a bottom of the lens unit.

6. The camera driving module of claim 5, wherein the at least one lower spring comprises a first lower spring and a second lower spring which are separated from each other, the first lower spring and the second lower spring are on a same horizontal plane.

7. The camera driving module of claim 1, wherein a number of the at least one damper agent is Na, and the following condition is satisfied:

$2 \leq Na \leq 14$.

8. The camera driving module of claim 1, wherein the at least one damper agent is made of UV curing material.

9. An image capturing unit, comprising:
the camera driving module of claim 1.

10. A camera driving module, comprising:
a base comprising an opening;
a casing disposed on the base, the casing comprising a through hole and at least one broadwise notch structure, the through hole corresponding to the opening of the base, the at least one broadwise notch structure being located nearby a periphery of the through hole;

a lens unit movably disposed at an inside of the casing;

a coil fixed to the lens unit and located at an outside of the lens unit;

a magnetic element located at the inside of the casing, the magnetic element facing toward the coil;

at least one spring disposed on the lens unit; and at least one damper agent configured to damp movement of the lens unit, and the at least one damper agent being disposed between the at least one broadwise notch structure and the lens unit.

11. The camera driving module of claim 10, wherein a depth of the at least one broadwise notch structure is d, and the following condition is satisfied:

0.02 [mm]<$d$<0.80 [mm].

12. The camera driving module of claim 10, wherein a depth of the at least one broadwise notch structure is d, and the following condition is satisfied:

0.15 [mm]<$d$<0.60 [mm].

13. The camera driving module of claim 10, wherein the at least one broadwise notch structure comprises an arc form.

14. The camera driving module of claim 10, wherein a number of the at least one broadwise notch structure of the casing is Nn, and the following condition is satisfied:

2≤$Nn$≤10.

15. The camera driving module of claim 10, wherein the lens unit comprising:

a carrier movably disposed on the casing, the carrier comprising an object-side portion, at least three inner edge surfaces and the at least one protruding structure, the object-side portion comprising an object-side central aperture, the at least three inner edge surfaces having different diameters which are larger than a diameter of the object-side central aperture; and a lens assembly comprising at least three lens elements having different diameters, a central axis of the lens assembly corresponding to the object-side central aperture of the carrier, the lens assembly being disposed in the carrier, the carrier and the lens assembly being jointly movable relative to the base.

16. The camera driving module of claim 15, wherein the object-side portion of the carrier further comprises an annular wall surrounding the object-side central aperture, the annular wall comprises two slopes and a tip end structure formed by the two slopes, and an angle between each of the two slopes and the central axis of the lens assembly is larger than 0 degree and smaller than 90 degrees.

17. The camera driving module of claim 16, wherein a part of the carrier surrounded by the coil is located in the casing, and the object-side portion of the carrier is exposed to outside.

18. The camera driving module of claim 15, wherein the carrier comprising:

at least one protruding structure corresponding to the through hole of the casing, the least one protruding structure extending toward the through hole of the casing and the least one protruding structure is exposed to outside through the broadwise notch structure.

19. The camera driving module of claim 18, wherein a curvature radius of the arc form of the at least one broadwise notch structure is R, a diameter of the at least one protruding structure is Φ, and the following condition is satisfied:

0.5<$R/\Phi$<2.3.

20. The camera driving module of claim 19, wherein the curvature radius of the arc form of the at least one broadwise notch structure is R, the diameter of the at least one protruding structure is Φ, and the following condition is satisfied:

0.7<$R/\Phi$<1.8.

* * * * *